US009151375B2

(12) United States Patent
Kram et al.

(10) Patent No.: US 9,151,375 B2
(45) Date of Patent: Oct. 6, 2015

(54) HYDRODYNAMIC COUPLING ARRANGEMENT, PARTICULARLY HYDRODYNAMIC TORQUE CONVERTER

(75) Inventors: Matthias Kram, Volkach (DE); Michael Wirachowski, Wuerzburg (DE); Monika Rössner, Donnersdorf (DE); Jörg Sudau, Niederwerrn (DE); Erwin Wack, Niederwerrn (DE); Reinhard Feldhaus, Euerbach (DE); Ralf Fambach, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 590 days.

(21) Appl. No.: 13/457,622

(22) Filed: Apr. 27, 2012

(65) Prior Publication Data

US 2012/0273317 A1    Nov. 1, 2012

(30) Foreign Application Priority Data

Apr. 28, 2011  (DE) .......................... 10 2011 017 653

(51) Int. Cl.
*F16H 45/02* (2006.01)

(52) U.S. Cl.
CPC .......... *F16H 45/02* (2013.01); *F16H 2045/021* (2013.01); *F16H 2045/0231* (2013.01); *F16H 2045/0284* (2013.01)

(58) Field of Classification Search
CPC .............................................. F16H 2045/0231
USPC ................ 192/3.28, 3.29, 3.3; 464/68.7, 68.8
See application file for complete search history.

(56) References Cited

U.S. PATENT DOCUMENTS

| 5,230,409 A | * | 7/1993 | Tanaka et al. ................ 192/3.28 |
| 8,161,740 B2 | | 4/2012 | Krause et al. |
| 8,342,306 B2 | * | 1/2013 | Werner et al. ................ 192/3.3 |
| 8,807,310 B2 | * | 8/2014 | Takikawa et al. ............ 192/3.29 |
| 2011/0192692 A1 | * | 8/2011 | Werner et al. ............... 192/3.29 |
| 2011/0240432 A1 | * | 10/2011 | Takikawa et al. ............ 192/3.29 |

FOREIGN PATENT DOCUMENTS

| DE | 10 2007 057 431 | 6/2009 |
| DE | 102008057647 | 6/2009 |
| DE | 10 2009 042 837 | 4/2010 |

* cited by examiner

*Primary Examiner* — Rodney H Bonck
*Assistant Examiner* — Stacey Fluhart
(74) *Attorney, Agent, or Firm* — Cozen O'Connor

(57) ABSTRACT

A hydrodynamic coupling arrangement, particularly hydrodynamic torque converter, wherein at least one torsional vibration damper arrangement comprises at least two torsional vibration dampers which are arranged so as to be radially staggered and substantially aligned axially with respect to one another, wherein the first torsional vibration damper is arranged on the radially outer side of the second torsional vibration damper, and wherein the at least one torsional vibration damper arrangement is coupled with the other torsional vibration damper arrangement in an area radially between the first damper element unit and the second damper element unit.

20 Claims, 5 Drawing Sheets

HYDRODYNAMIC COUPLING ARRANGEMENT, PARTICULARLY HYDRODYNAMIC TORQUE CONVERTER

BACKGROUND OF THE INVENTION

1. Field of the Invention

The present invention is directed to a hydrodynamic coupling arrangement, particularly hydrodynamic torque converter.

2. Background of the Invention

A torque converter of the type disclosed herein includes a housing arrangement which is filled or fillable with fluid, an impeller which is rotatable with the housing arrangement around an axis of rotation, a turbine arranged in the housing arrangement, a lockup clutch having a first friction surface formation which is coupled with the housing arrangement for rotation around the axis of rotation and a second friction surface formation which is coupled with a driven member for rotation around the axis of rotation and which can be brought into frictional engagement with the first friction surface formation, a first torsional vibration damper arrangement in the torque transmission path between the lockup clutch and the driven member, which torsional vibration damper arrangement has a first input area which is coupled with the second friction surface formation for jointly rotating around the axis of rotation and a first output area which is rotatable with respect to the first input area around the axis of rotation against the action of a first damper element arrangement, and a second torsional vibration damper arrangement having a second input area which is coupled with the first output area for jointly rotating around the axis of rotation and a second output area which is rotatable with respect to the second input area around the axis of rotation against the action of a second damper element arrangement and which is coupled with the driven member for jointly rotating around the axis of rotation, wherein the first torsional vibration damper arrangement and the second torsional vibration damper arrangement are arranged successively in direction of the axis of rotation.

A hydrodynamic coupling arrangement constructed as a hydrodynamic torque converter is known from DE 10 2008 057 647 A1. In this hydrodynamic coupling arrangement, two axially and radially staggered torsional vibration damper arrangements, each having an individual torsional vibration damper, are provided in the torque transmission path between a lockup clutch and a driven hub acting as driven member. An output area of the radially outer first torsional vibration damper arrangement is connected through integral construction to an input area of the axially offset second torsional vibration damper arrangement. A cover disk element of a secondary side which also provides the output area of the first torsional vibration damper extends radially inwardly, its radially inner area providing not only the input area of the second torsional vibration damper arrangement but also a portion of the primary side thereof.

It is an object of the present invention to provide a hydrodynamic coupling arrangement having two torsional vibration damper arrangements which are axially offset and are located adjacent to one another and which can be coupled with one another in a simple manner for transmission of torque while making optimal use of installation space.

SUMMARY OF THE INVENTION

According to the present invention, this object is met by a hydrodynamic coupling arrangement, particularly hydrodynamic torque converter, comprising a housing arrangement which is filled or fillable with fluid, an impeller which is rotatable with the housing arrangement around an axis of rotation, a turbine arranged in the housing arrangement, a lockup clutch having a first friction surface formation which is coupled with the housing arrangement for rotation around the axis of rotation and a second friction surface formation which is coupled with a driven member for rotation around the axis of rotation and which can be brought into frictional engagement with the first friction surface formation, a first torsional vibration damper arrangement in the torque transmission path between the lockup clutch and the driven member, which torsional vibration damper arrangement has a first input area which is coupled with the second friction surface formation for jointly rotating around the axis of rotation and a first output area which is rotatable with respect to the first input area around the axis of rotation against the action of a first damper element arrangement, and a second torsional vibration damper arrangement having a second input area which is coupled with the first output area for jointly rotating around the axis of rotation and a second output area which is rotatable with respect to the second input area around the axis of rotation against the action of a second damper element arrangement and which is coupled with the driven member for jointly rotating around the axis of rotation, wherein the first torsional vibration damper arrangement and the second torsional vibration damper arrangement are arranged successively in direction of the axis of rotation.

According to a first aspect of the present invention, it is further provided that at least one torsional vibration damper arrangement comprises at least two torsional vibration dampers which are arranged so as to be radially staggered and substantially aligned axially with respect to one another, wherein a first torsional vibration damper comprises a first primary side and a first secondary side which is rotatable around the axis of rotation with respect to the first primary side against the action of a first damper element unit of the damper element arrangement, and a second torsional vibration damper comprises a second primary side, which together with the first secondary side provides an intermediate mass arrangement of the torsional vibration damper arrangement, and a second secondary side which is rotatable around the axis of rotation with respect to the second primary side against the action of a second damper element unit of the damper element arrangement, wherein the first torsional vibration damper is arranged on the radially outer side of the second torsional vibration damper, and wherein the at least one torsional vibration damper arrangement is coupled with the other torsional vibration damper arrangement in an area radially between the first damper element unit and the second damper element unit.

Owing to the fact that at least one of the torsional vibration damper arrangements in the inventive construction of a hydrodynamic coupling arrangement already comprises two torsional vibration dampers acting in series so that a total of at least three torsional vibration dampers acting in series is provided, the decoupling quality provided in the torque transmission path between the lockup clutch and the driven member is improved due to a comparatively large permitted relative rotation angle between the driven member and the lockup clutch, while spring stiffness is comparatively low. Due to the fact that the at least one torsional vibration damper arrangement having two torsional vibration dampers is coupled in a radial area between the two damper element units, it is possible for the installation space on the radially outer side or radially inner side with respect to this radial coupling area to be used for other components.

According to an alternative embodiment, a hydrodynamic coupling arrangement according to the present invention can be further developed in that at least one torsional vibration damper arrangement comprises at least two torsional vibration dampers which are arranged so as to be radially staggered and substantially aligned axially with respect to one another, wherein a first torsional vibration damper comprises a first primary side and a first secondary side which is rotatable around the axis of rotation with respect to the first primary side against the action of a first damper element unit of the damper element arrangement, and a second torsional vibration damper comprises a second primary side, which together with the first secondary side provides an intermediate mass arrangement of the torsional vibration damper arrangement, and a second secondary side which is rotatable around the axis of rotation with respect to the second primary side against the action of a second damper element unit of the damper element arrangement, wherein the first torsional vibration damper is arranged on the radially outer side of the second torsional vibration damper, and wherein the at least one torsional vibration damper arrangement is coupled with the other torsional vibration damper arrangement in a radial area of the first damper element unit or on the radially outer side of the first damper element unit.

Also in an embodiment of this type, the available installation space can be utilized very advantageously while taking advantage of the total decoupling by at least three torsional vibration dampers acting in series.

In order to be able to provide sufficient installation space also for the lockup clutch, particularly the friction surface formation thereof, it is further proposed that the other torsional vibration damper arrangement comprises an individual torsional vibration damper having a primary side and a secondary side which is rotatable around the axis of rotation with respect to the primary side against the action of the damper element arrangement, wherein the other torsional vibration damper arrangement is coupled in an area on the radially outer side of its damper element arrangement to the one torsional vibration damper arrangement, wherein it can be provided, for example, that the second torsional vibration damper arrangement is the one torsional vibration damper arrangement, i.e., the torsional vibration damper arrangement constructed with two radially staggered torsional vibration dampers, and the first torsional vibration damper arrangement is the other torsional vibration damper arrangement, i.e., the torsional vibration damper arrangement constructed with only one individual torsional vibration damper.

The mutual rotational coupling between the first output area and the second input area can be realized by at least one coupling element which is coupled with the latter, respectively.

According to another alternative embodiment of the present invention, a hydrodynamic coupling arrangement having the construction indicated in the introductory part can be further developed in that the first output area and the second input area are coupled with one another in an area on the radially inner side of the first damper element arrangement and second damper element arrangement.

In this embodiment, no volume areas are used, particularly in the radially outer area, for mutual coupling of the two torsional vibration damper arrangements so that installation space is available for other components.

In this respect, it can also be provided that at least one torsional vibration damper arrangement comprises at least two torsional vibration dampers which are arranged so as to be radially staggered and substantially aligned axially with respect to one another, wherein a first torsional vibration damper comprises a first primary side and a first secondary side which is rotatable around the axis of rotation with respect to the first primary side against the action of a first damper element unit of the damper element arrangement, and a second torsional vibration damper comprises a second primary side, which together with the first secondary side provides an intermediate mass arrangement of the torsional vibration damper arrangement, and a second secondary side which is rotatable around the axis of rotation with respect to the second primary side against the action of a second damper element unit of the damper element arrangement, wherein the first torsional vibration damper can be arranged on the radially outer side of the second torsional vibration damper.

It can further be provided that the other torsional vibration damper arrangement comprises an individual torsional vibration damper with a primary side providing an input area and a secondary side which is rotatable around the axis of rotation with respect to the primary side against the action of the first damper element arrangement and which provides an output area.

In order to be able to influence the decoupling quality by utilizing the mass moment of inertia of the turbine, it is proposed that the turbine is connected to the intermediate mass arrangement or to the driven member.

To bridge the axial distance between the two adjacent torsional vibration damper arrangements for producing the rotational coupling state in a simple manner, it is proposed that there is provided in at least at one area of the first output area and second input area a coupling area which extends to the other respective area of the first output area and second input area.

In an embodiment which can be realized structurally in a very simple manner but which is also very stable, it can be provided that at least one coupling area is formed integral with the at least one area of the first output area and second input area.

Particularly when there is also a radial distance between the two coupling areas, it can be provided for bridging these coupling areas that at least one coupling element is coupled with the coupling area of the first output area and the coupling area of the second input area.

At least one of the coupling areas can be provided by a coupling element which is fixed to the at least one area of the first output area and second input area.

The rotational coupling state between the coupling areas can be realized, for example, in that at least one coupling area is coupled with a coupling element or with the other coupling area by engaging in the manner of teeth for jointly rotating around the axis of rotation.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The present invention will be described in detail in the following with reference to the accompanying drawings in which.

DETAILED DESCRIPTION OF THE PRESENTLY PREFERRED EMBODIMENTS

Figure 1:
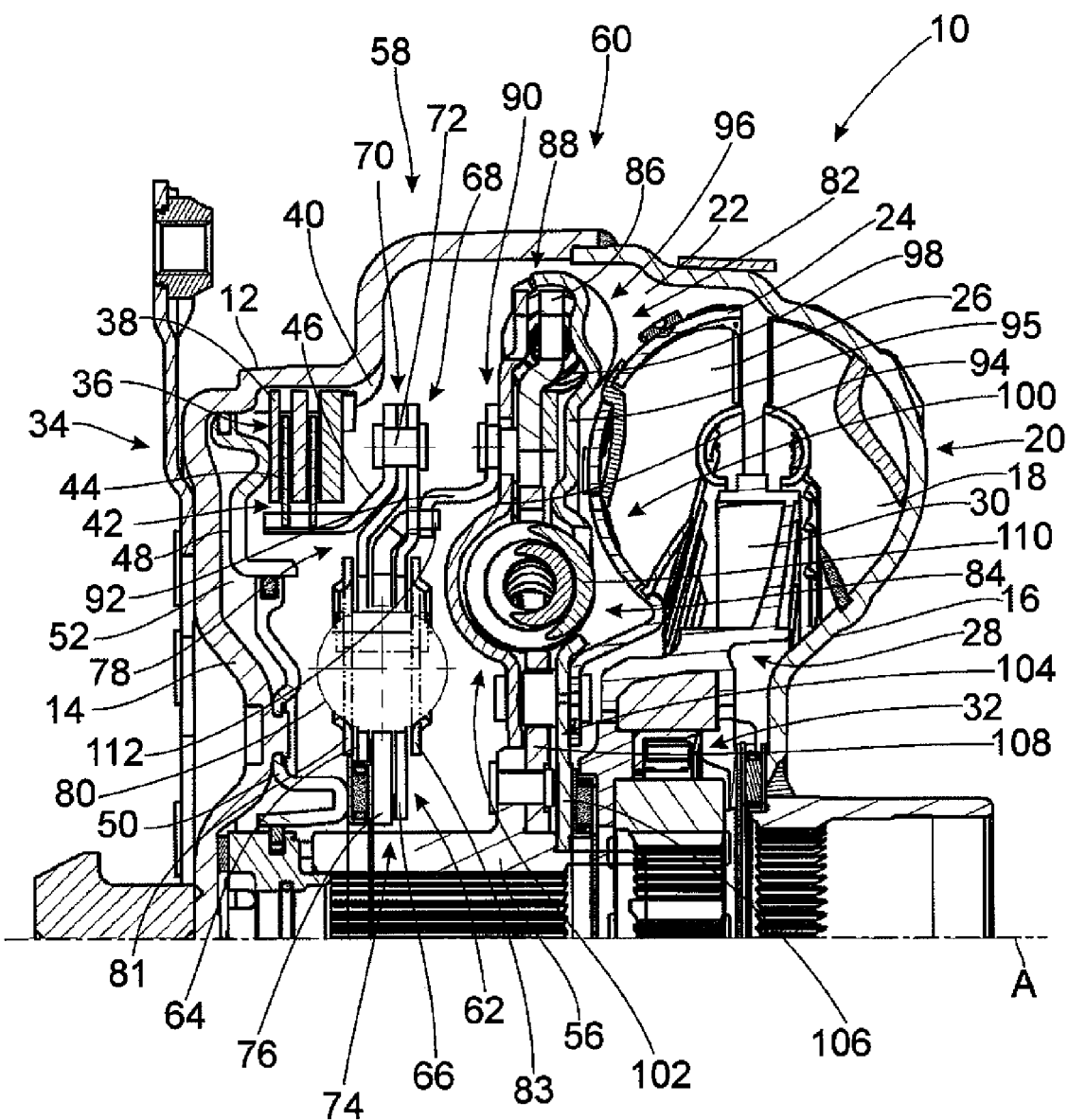
FIG. 1 is a partial longitudinal sectional view through a coupling arrangement constructed as hydrodynamic torque converter.

In FIG. 1, a hydrodynamic coupling arrangement constructed as a hydrodynamic torque converter is designated generally by 10. The coupling arrangement 10 comprises a housing arrangement 12 having a housing shell 14 which is to be positioned on the drive side, i.e., facing a drive unit, for example, and a housing shell 16 which is to be positioned on the driven side, i.e., facing a transmission, for example, and which is connected to the housing shell 14 on the radially outer side. This housing shell 16 has at its inner side a plurality of impeller blades 18 arranged successively in circumferential direction around an axis of rotation A and, with the latter, essentially forms an impeller 20 which is rotatable with the housing arrangement 12 around the axis of rotation A. Further, a turbine 24 having turbine blades 26 located opposite the impeller blades 18 is arranged in the interior space 22 of the housing arrangement 12. A stator 28 is located axially between the impeller 20 and the turbine 24, its stator blades 30 being supported on a supporting hollow shaft or the like, not shown, by means of a freewheeling arrangement, designated generally by 32, so as to be rotatable in one direction around the axis of rotation A.

A lockup clutch 34 comprises disk-like friction elements 38 providing a first friction surface formation 36. In their radially outer area, these friction elements 38 are in rotational coupling engagement with a toothing formation 40 formed at the housing shell 14 so that they are rotatable together with the housing arrangement 12 around the axis of rotation A but, in principle, axially displaceable with respect to the latter. A second friction surface formation 42 of the lockup clutch 34 comprises disk-like friction elements 44 which are arranged so as to alternate with the friction elements 38 of the first friction surface formation 36. In their radially inner area, these friction elements 44 are in rotational coupling engagement with a friction element carrier 46 and a toothing formation provided at the latter, respectively, so that they are rotatable with the friction element carrier 46 around the axis of rotation A but are axially displaceable with respect to the latter in principle.

Together with a piston carrying element 50 which is fixed to the housing shell 14, a coupling piston 48 separates a pressure space 52 from the interior space 22 of the housing arrangement 12. By supplying pressure fluid to this pressure space 52, for example, via a supply opening formed in a transmission input shaft or the like, the piston which is guided so as to be movable axially in a fluid-tight manner in its radially inner area at the piston carrying element 50 and in its radially outer area at a housing shell 14 can be moved axially in direction of the two friction surface formations 36, 42 and can press the latter into mutual frictional engagement. In this regard, the friction element of the first friction surface formation 36 that is positioned the farthest axially from the coupling piston 48 is supported axially with respect to the housing shell 14, for example, by a retaining ring or the like.

Two torsional vibration damper arrangements 58, 60 are provided in the torque transmission path between the lockup clutch 34 and a driven hub 56 acting as driven member. These torsional vibration damper arrangements 58, 60 are located adjacent to one another in direction of the axis of rotation A and likewise produce a rotational coupling between the friction elements of the second friction surface formation 42 and the driven hub 56 so that the second friction surface formation 42 is basically coupled with the driven hub 56 for jointly rotating around the axis of rotation A.

The first torsional vibration damper arrangement 58 following the lockup clutch 34 in the torque flow comprises an individual torsional vibration damper 62 with a primary side 68 which is essentially provided by two cover disk elements 64, 66 and which simultaneously also provides the first input area 70 of the first torsional vibration damper arrangement 58. The friction element carrier 46 is connected, for example, by rivet bolts 72, to these two cover disk elements 64, 66 so as to be fixed with respect to rotation relative to them, the cover disk elements 64, 66 being fixedly connected to one another on the radially outer side by rivet bolts 72.

A secondary side 74 of the torsional vibration damper arrangement 62 comprises a central disk element 76 which is positioned axially between the two cover disk elements 64, 66 and which also essentially provides the first output area 78 of the first torsional vibration damper arrangement 58. A first damper element arrangement 80 acts between the primary side 68 and the secondary side 74. This first damper element arrangement 80 can comprise a plurality of helical pressure springs which are arranged in succession in circumferential direction, for example, and which are, or can be, supported with respect to the cover disk elements 64, 66 on the one hand and with respect to the central disk element 76 on the other hand. Also, a plurality of helical pressure springs of this kind can be supported with respect to one another, possibly by means of annular supporting elements 81, 83, successively in circumferential direction in order to increase the total spring path and, therefore, the relative rotatability of the primary side 68 and secondary side 74. Accordingly, the latter are rotatable with respect to one another around the axis of rotation A in circumferential direction against the restoring action of the first damper element arrangement 80.

The second torsional vibration damper arrangement 60 comprises two torsional vibration dampers 82, 84 which are positioned in a radially staggered manner and approximately in the same axial area, i.e. the two torsional vibration dampers 82 and 84 are substantially aligned axially with respect to one another. The radially outer first torsional vibration damper 82 comprises a first primary side 88 which is essentially provided by a central disk element 86 and which also provides the second input area 90 of the second torsional vibration damper arrangement 60. This central disk element 86 is coupled with the central disk element 76 of the torsional vibration damper 62 of the first torsional vibration damper arrangement 58 by one or more coupling elements 92. In the radially outer area, the central disk element 76 which essentially also provides the first output area 78 in this radially outer area is bent axially and, with this axially bent portion, forms a coupling area 112 which is accordingly integral with the first output area 78. This coupling area 112 can be constructed with an axially extending toothing formation which is in a rotational coupling engagement with a complementary toothing formation of the coupling element 92, which coupling element 92 is annular, for example. The coupling element 92 extends toward the second torsional vibration damper arrangement 60 and is connected to the latter, or to the second input area 90 thereof, in an area radially between two damper element units 98, 110—to be described in the following—of a damper element arrangement 100 of the second torsional vibration damper arrangement 60, for example, by means of a rivet connection with the central disk element 86 in its radially inner area.

In their radially outer area, two cover disk elements 94, 95 of the second torsional vibration damper arrangement 60 form a first secondary side 96 of the radially outer first torsional vibration damper 82. In this radially outer area, the first damper element unit 98 of the second damper element arrangement, designated generally by 100, of the second torsional vibration damper arrangement 60 acts between the cover disk elements 94, 95, i.e., the first secondary side 96, and the central disk element 86, i.e., the first primary side 88. This first damper element unit 98 can in turn comprise a plurality of helical pressure springs which are arranged successively in circumferential direction and also, of course, so as to be nested one inside the other and which, by their compressibility, allow a relative rotation between the first primary side 88 and the first secondary side 96.

In their radially inner area, the two cover disk elements 94, 95 form a second primary side 102 of the radially inner second torsional vibration damper 84 of the second torsional vibration damper arrangement 60. In this area, a central disk element 108 which essentially provides a second secondary side 104 of the radially inner second torsional vibration damper 84 and, at the same time, also provides a second output area 106 of the second torsional vibration damper arrangement 60 is situated axially between the two cover disk elements 94, 95. This central disk element 108 is connected to the driven hub 56, for example, by riveting, but possibly also by forming integral with the driven hub 56.

The second damper element unit 110 of the second damper element arrangement 100 acts between the second primary side 102, i.e., the cover disk elements 94, 95, and the second secondary side 104, i.e., the central disk element 108, and accordingly allows a relative rotation between these two assemblies. The second damper element unit 110 can also comprise a plurality of helical pressure springs or the like which are arranged successively in circumferential direction, also possibly so as to be nested one inside the other.

The two cover disk elements 94, 95 essentially form an intermediate mass arrangement of the second torsional vibration damper arrangement 60 to which the turbine 24 is also connected. For example, rivet bolts which connect the two cover disk elements 94, 95 on the radially inner side can be used for this purpose. The turbine 24 accordingly contributes to increasing the mass of the intermediate mass arrangement.

In order to achieve a defined axial positioning of the two torsional vibration damper arrangements 58, 60, the first torsional vibration damper arrangement 58 is supported with respect to the housing shell 14 of the housing arrangement 12, for example, by means of its central disk element 76 by a rolling element bearing or the like at the piston carrying element 50, for example, at a radially inner axial bulge thereof, and accordingly in a first axial direction, i.e., at left in FIG. 1. The second torsional vibration damper arrangement 60 is supported in a second axial direction, i.e., at right in FIG. 1, with respect to the housing shell 16 of the housing arrangement 12, for example, by means of the cover disk element 95 and a rolling element bearing or the like at the freewheeling arrangement 32 and by means of the latter. The two torsional vibration damper arrangements 58, 60 can be supported on one another by the assemblies engaging with one another, i.e., central disk element 76 and coupling element 92.

It will be seen from the preceding description that three torsional vibration dampers 62, 82 and 84 are accordingly positioned in the torque transmission path between the second friction surface formation 42 and the driven hub 56, and the two torsional vibration dampers 82, 84 are structurally linked, while torsional vibration damper 62, i.e., essentially the first torsional vibration damper arrangement 58, is provided as an independent, separate assembly which can be brought into operative connection with the two torsional vibration dampers 82, 84 of the second torsional vibration damper arrangement 60 by moving them toward one another axially in the manner described above. In this regard, it will be seen from FIG. 1 that the torsional vibration damper 62 is constructed with comparatively short radial structural dimensions so that substantial areas of its damper element arrangement 80 are positioned on the radially inner side of the radially inner second damper element unit 110 of the second damper element arrangement 100. This makes it possible to move the two axially adjacent torsional vibration damper arrangements 58, 60 so close together that they can even overlap axially in areas.

In the embodiment shown in FIG. 1, the friction surface formations 36, 42 whose friction surfaces provide the torque transmission connection between the housing arrangement 12 and the torsional vibration damper arrangements 58, 60 lie substantially on the radially outer side of the first torsional vibration damper arrangement 58. Let it be noted that within the meaning of the present invention a positioning of this kind on the radially outer side means primarily that the assemblies in question, i.e., in this case the friction surface formations 36, 42, are positioned on the radially outer side of the essential areas or essential volume area of the first torsional vibration damper arrangement 58, particularly on the radially outer side of the first damper element arrangement 80 thereof. This does not mean, for example, that the radially outer end areas of the two cover disk elements 64, 66 cannot extend so as to radially overlap the friction surface formations 36, 42.

Further, it will be seen from FIG. 1 that the two torsional vibration damper arrangements 58, 60 are positioned axially substantially between the turbine 24 and the two friction surface formations 36, 42. Let it also be noted in this connection that this does not preclude an at least partial axial overlapping, for example, of the friction surface formations 36, 42 with the first torsional vibration damper arrangement 58. Rather, this signifies that, coming from the axial area of the coupling arrangement 10 remote of the turbine 24, there are initially portions of the friction surface formations 36, 42 which are then also followed during continued movement toward the turbine 24 by the first torsional vibration damper arrangement 58 or portions thereof and then by the second torsional vibration damper arrangement 60 or portions thereof.

As a result of the construction of a coupling arrangement 10 shown in FIG. 1, a mode of operation which is optimized with respect to the damping characteristic can be achieved on the one hand because the two torsional vibration damper arrangements 58, 60 can be optimally designed for the vibration excitations occurring in a drive system, also with respect to the primary-side and secondary-side masses cooperating with these torsional vibration damper arrangements 58, 60. At the same time, a space-saving construction is achieved in that the first torsional vibration damper arrangement 58 and the friction surface formations 36, 42 are radially staggered, which permits an at least slight axial overlapping.

Figure 2:
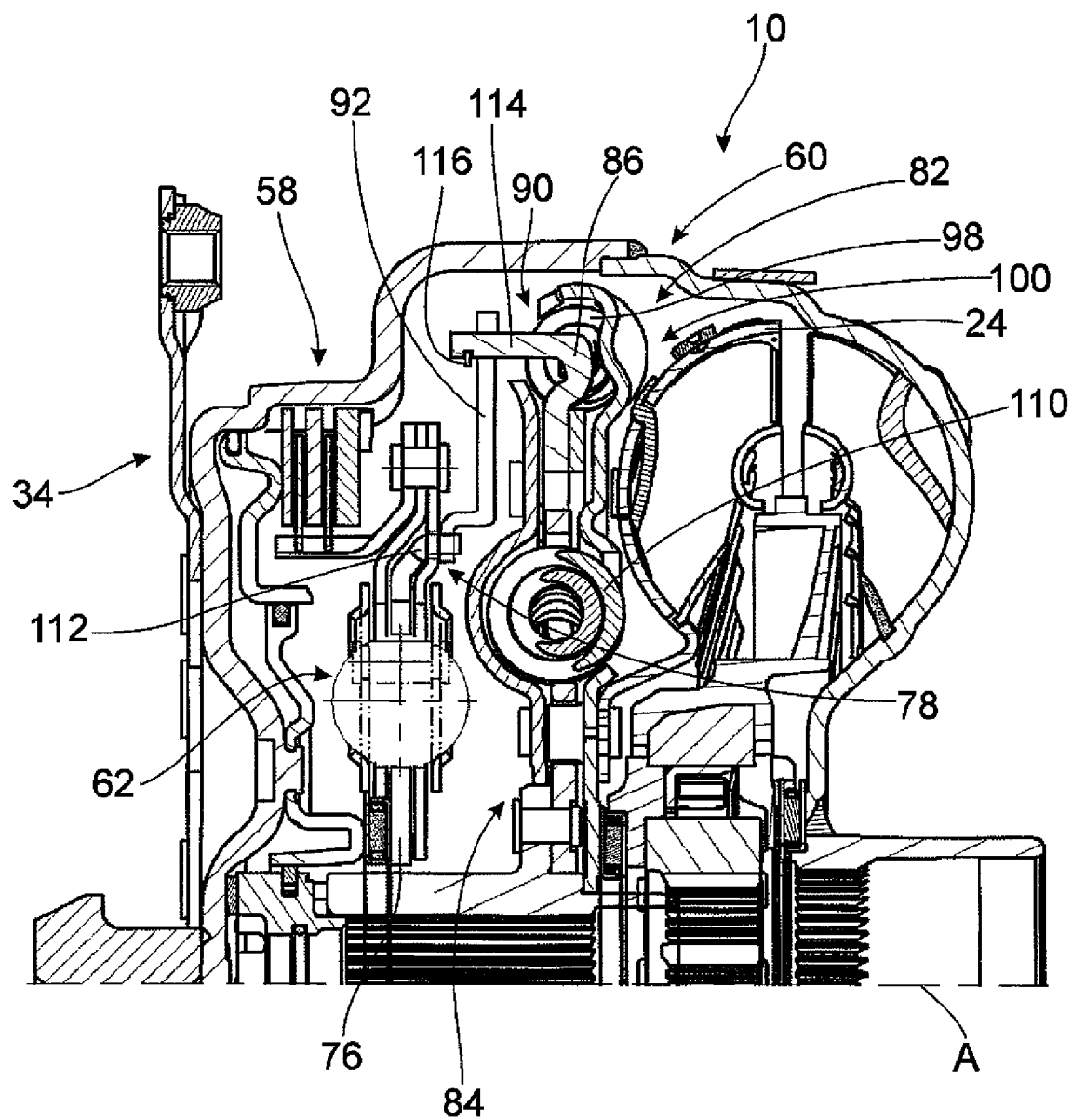
FIG. 2 is an alternative construction in a view corresponding to FIG. 1.

A modified embodiment of a hydrodynamic coupling arrangement 10 is shown in FIG. 2. With respect to its basic construction, this modified embodiment corresponds in important aspects to the hydrodynamic coupling arrangement 10 described above with reference to FIG. 1 so that reference is had to the preceding description.

It will be seen that in this embodiment, also, the torsional vibration damper arrangements 58, 60 which are positioned axially substantially between the lockup clutch 34 and the turbine 24 are constructed in such a way that the torsional vibration damper arrangement 60 located axially nearer to the lockup clutch 34 comprises an individual torsional vibration damper 62, while the torsional vibration damper arrangement located nearer to the turbine 24 comprises two torsional vibration dampers 82, 84 which are radially staggered but which are situated in substantially the same axial area. The coupling between the first output area 78, which is again constructed in this instance with a coupling area 112 extending axially toward torsional vibration damper arrangement 60 as integral component part thereof, particularly of the central disk element 76, and the second input area 90 is again carried out by means of a coupling element 92 which is constructed, for example, as an annular disk and which can be, for example, in a toothing engagement with the coupling area 112 at the first output area 78 and can extend from the latter substantially toward the radially outer side.

A coupling area 114 which extends axially toward torsional vibration damper arrangement 58 and which is provided by axial bending of the central disk element 86 is formed at the second input area 90. The coupling element 92 can also be coupled with this coupling area 114 for jointly rotating around an axis of rotation A by means of engaging in the manner of teeth; in order to maintain this toothing engagement, particularly in a preassembly situation, a retaining ring 116 can be fastened to the coupling area 114 to prevent axial detachment of the coupling element 92.

It will be seen in this case that the second torsional vibration damper arrangement 60 which is constructed with two radially staggered torsional vibration dampers 82, 84 can be connected to the first torsional vibration damper arrangement 58, i.e., provides the coupling area 114 serving for the connection, in a radial area in which the first damper element unit 98 of the radially outer first torsional vibration damper 82 is also located.

Let it be noted that, given appropriate installation space, the cover disk element 86 can also be constructed with the axial bend in an area on the radially outer side of the damper springs of the first damper element unit 98 so that the coupling of the second torsional vibration damper arrangement 60, or of the second input area 90 thereof, with the first torsional vibration damper arrangement 58 is then realized in an area on the radially outer side of the first damper element arrangement 98, i.e., the coupling element 92 used for producing the coupling state in this instance also interacts in rotational coupling with the coupling area 114 in a radial area of this kind.

Figure 3:
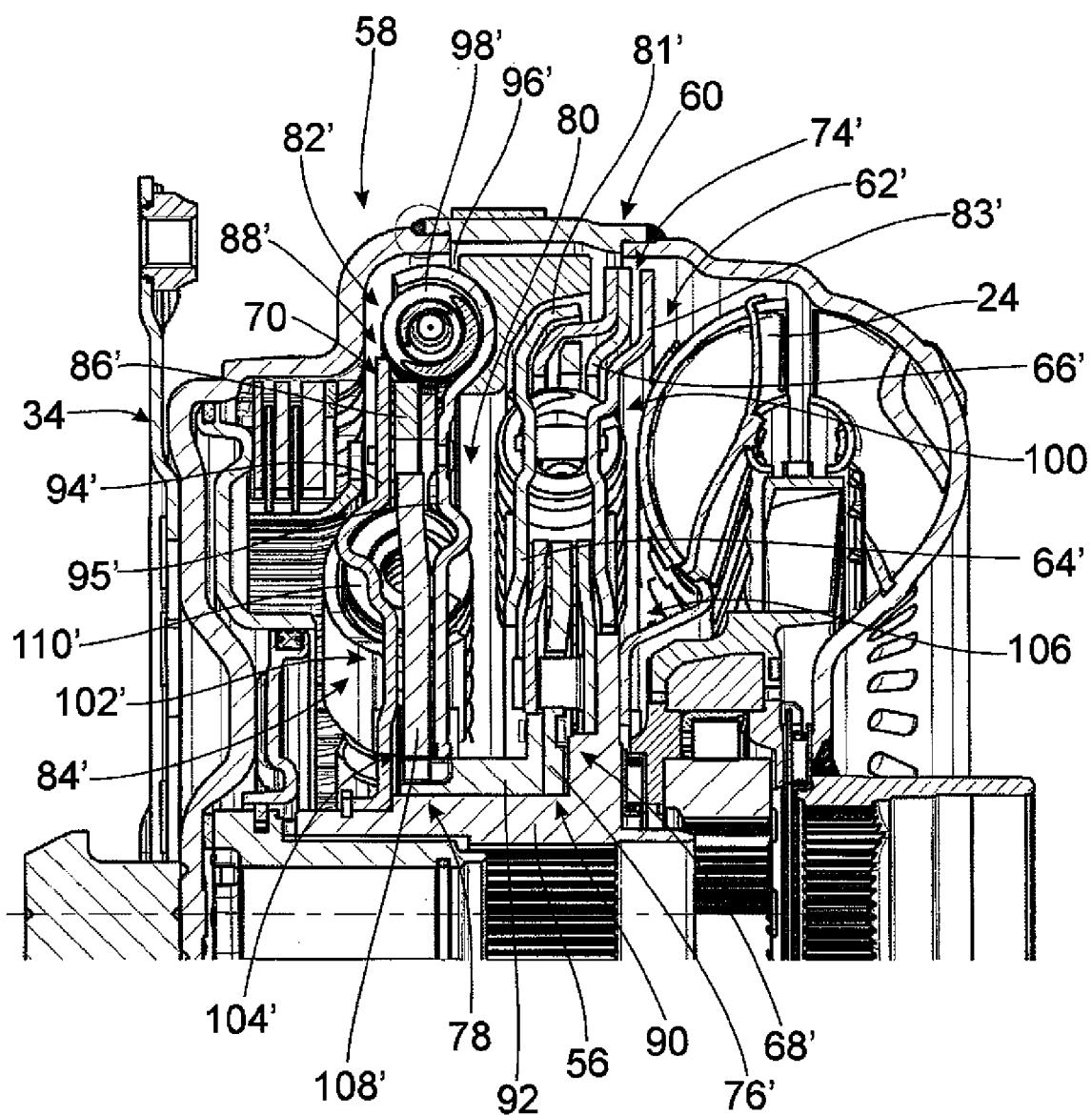
FIG. 3 is an alternative construction in a view corresponding to FIG. 1.

Another modified embodiment is shown in FIG. 3. This also corresponds to the preceding description with respect to its basic construction. However, it will be seen that the first torsional vibration damper arrangement 58 in this case is constructed with two torsional vibration dampers 82', 84' which are positioned so as to be radially staggered but at substantially the same axial level. The first input area 70 is essentially provided by the central disk element 86' of the radially outer first torsional vibration damper 82' which likewise also provides the first primary side 68'.

In their radially outer area, the two cover disk elements 94' and 95' provide the first secondary side 96' which cooperates with the damper springs of the first damper element unit 98'. In their radially inner area, the two cover disk elements provide the second primary side 102'. The central disk element 108' which is located in this radially inner area between the two cover disk elements 94' and 95' essentially provides the second secondary side 104' and also the first output area 78, respectively. The damper elements of the second damper element unit 110' of the first damper element arrangement 80 of the first torsional vibration damper arrangement 58 act between the central disk element 108' and the two cover disk elements 94' and 95'.

The second torsional vibration damper arrangement 60 comprises an individual torsional vibration damper 62' whose primary side 68' is substantially provided by the central disk element 76' which likewise substantially provides the second input area 90 in its radially inner area. The secondary side 74' of the torsional vibration damper 62' comprises the two cover disk elements 64', 66' which, for example, are fixedly connected to one another on the radially outer side by riveting or the like and which, like the central disk element 76', cooperate with the damper springs of the second damper element arrangement 100 in order to transmit torque between the primary side 68' and the secondary side 74'. In this respect, the damper springs of the damper element arrangement 100 can be supported at the central disk element 76' and cover disk elements 64', 66'. When a plurality of springs which, for example, extend linearly are arranged directly one after the other, they can also be supported at one another by the annular disk-shaped supporting elements 81' and 83'.

The second output area 106 of the second torsional vibration damper arrangement 60, which is essentially provided in this case by the cover disk element 64' which is positioned closer to the turbine 24, is fixedly connected, for example, by riveting, to the driven hub 56 acting as driven member. The turbine 24 is also connected to the driven hub 56 so that it contributes to increasing a driven-side mass or a driven-side mass moment of inertia in this embodiment.

A coupling element 92 which is constructed annularly, for example, is provided in the radially inner area of the two torsional vibration damper arrangements 58, 60, i.e., on the radially inner side of the two damper element arrangements 80, 100 thereof. In its axial end area located near the first torsional vibration damper arrangement 58 and first output area 78, the coupling element 92 is provided with a toothing, for example, an outer circumferential toothing, which is in a rotational coupling engagement with a complementary toothing at the radially inner area of the cover disk element 108', i.e., of the first output area 78. In its axial end area near the second torsional vibration damper arrangement 60 and second input area 90 thereof, respectively, it is fixedly connected to the central or cover disk element 76', for example, by riveting. Accordingly, the two torsional vibration damper arrangements 58, 60 can be coupled with one another by moving them toward one another axially and, in so doing, producing the toothing engagement between the coupling element 92 and the central disk element 108' for torque transmission.

In this regard, it will be seen from FIG. 3 that the coupling element 92 can be centered radially, for example, at the outer circumference of the driven hub 56 as can, for example, the cover disk element 95' of the first torsional vibration damper arrangement 58, which cover disk element 95' is positioned closer to the lockup clutch 34.

Figure 4:
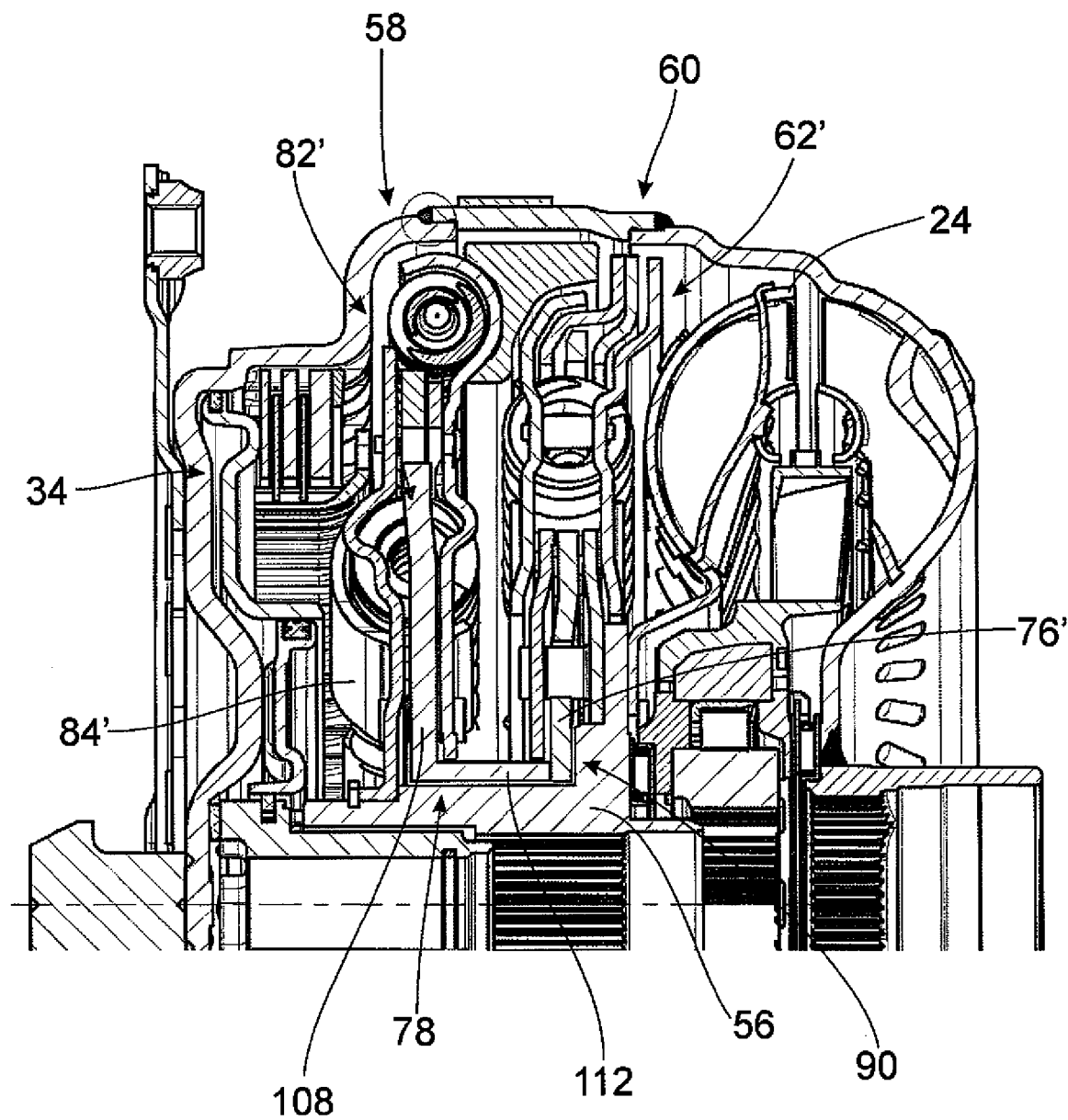
FIG. 4 is an alternative construction in a view corresponding to FIG. 1.

A modification of the embodiment shown in FIG. 3 is shown in FIG. 4. This corresponds to the construction shown in FIG. 3, particularly also with respect to the construction of the two torsional vibration damper arrangements 58, 60. The first torsional vibration damper arrangement 58 lying closer to the lockup clutch 34 is also formed in FIG. 4 with the two radially staggered torsional vibration dampers 82', 84', while the second torsional vibration damper arrangement lying axially closer to the turbine 24 is constructed with an individual torsional vibration damper 62'.

It is clearly shown in FIG. 4 that the central disk element 108' which essentially also provides the first output area 78 is curved axially in its radially inner area, which is, for example, radially centered on the driven hub 56, and, with a coupling area 112 which, for example, is constructed annularly or comprises a plurality of axial arms, extends axially to the second input area 90. This coupling area 112 which is accordingly formed integral with the first output area 78 can have, for example, in its axial end, a toothing formation which is in, or can be brought into, a rotational coupling engagement with a corresponding toothing formation at the inner circumference of the central disk element 76' of the torsional vibration damper 62'. Accordingly, a coupling area 112 of the first torsional vibration damper arrangement 58, which coupling area 112 is integral with the first output area 78, bridges the axial distance between the two torsional vibration damper arrangements 58, 60.

Figure 5:
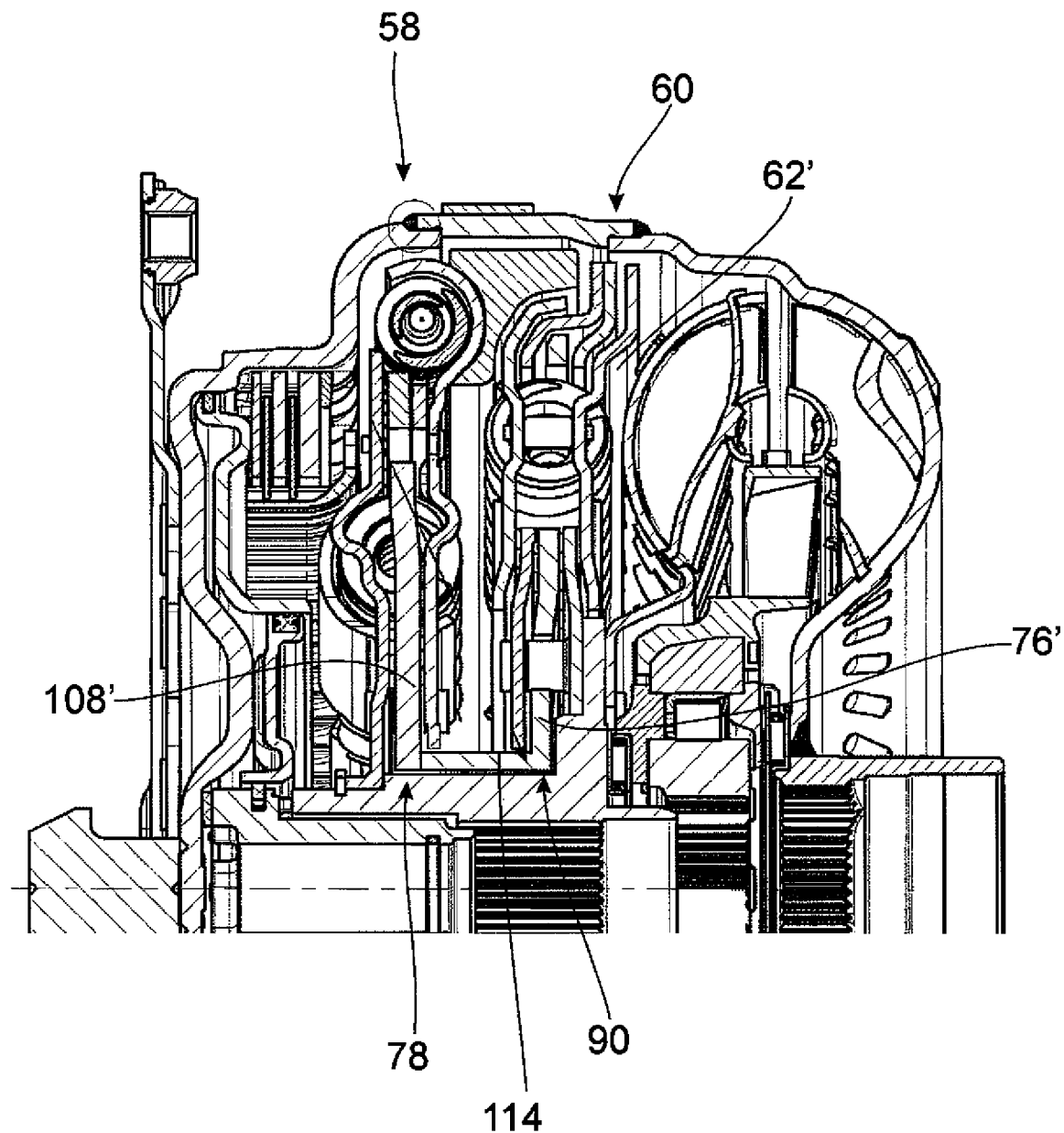
FIG. 5 is an alternative construction in a view corresponding to FIG. 1.

In the embodiment shown in FIG. 5, this axial distance is bridged by a coupling area 114 which forms an integral component part of the second input area 90 of the second torsional vibration damper arrangement 60. To this end, the central disk element 76' can be axially curved in its radially inner area and can extend axially toward the first output area 78 by a coupling area 114 which is shaped annularly or which comprises a plurality of arm portions. To produce the rotational coupling connection, the coupling area 114 and the central disk element 108' can have mutually complementing toothings which can be brought into mutual rotational coupling engagement when the two torsional vibration damper arrangements 58, 60 are moved toward one another axially.

Let it be noted in this respect that coupling areas 112 and 114, respectively, which are formed integrally in each instance and extend to the other respective torsional vibration damper arrangement can, of course, also be provided at the two torsional vibration damper arrangements 58, 60 and are then formed with toothing formations in their end areas lying close to one another and are brought into rotational coupling engagement. Of course, coupling elements which are constructed as separate structural component parts and are then formed with toothings in their axial end areas located close to one another and are brought into rotational coupling engagement could also be fixed to the first output area 78 and to the second input area 90.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A hydrodynamic coupling arrangement comprising:
a housing arrangement (12) filled or fillable with fluid;
an impeller (20) rotatable with said housing arrangement (12) around an axis of rotation;
a turbine (24) arranged in said housing arrangement (12);
a lockup clutch (34) having a first friction surface formation (36) coupled with said housing arrangement (12) for rotation around the axis of rotation (A) and a second friction surface formation (42) coupled with a driven member (56) for rotation around said axis of rotation (A) and capable of being brought into frictional engagement with said first friction surface formation (36);
a first torsional vibration damper arrangement (58) disposed in a torque transmission path between said lockup clutch (34) and said driven member (56); said first torsional vibration damper arrangement (58) having a first input area (70) coupled for joint rotation with said second friction surface formation (42) around said axis of rotation and a first output area (78) rotatable with respect to the first input area (70) around the axis of rotation (A) against the action of a first damper element arrangement (80);
a second torsional vibration damper arrangement (60) having a second input area (90) coupled for joint rotation with said first output area (78) around the axis of rotation (A) and a second output area (106) rotatable with respect to said second input area (90) around said axis of rotation (A) against the action of a second damper element arrangement (100) and coupled with said driven member (56) for jointly rotating around said axis of rotation (A); said first torsional vibration damper arrangement (58) and said second torsional vibration damper arrangement (60) arranged successively in a direction of said axis of rotation (A); at least one of said torsional vibration damper arrangements (60) comprising at least two torsional vibration dampers (82, 84) arranged so as to be radially staggered and substantially aligned axially with respect to one another; wherein a first of said two torsional vibration dampers (82) comprises a first primary side (88) and a first secondary side (96) rotatable around the axis of rotation (A) with respect to said first primary side (88) against the action of a first damper element unit (98) of said damper element arrangement (100); and a second of said two torsional vibration dampers (84) comprises a second primary side (102), said second primary side providing together with said first secondary side (96) an intermediate mass arrangement of the torsional vibration damper arrangement (60), and a second secondary side (104) rotatable around the axis of rotation (A) with respect to said second primary side against the action of a second damper element unit (110) of said second damper element arrangement (100); wherein said first torsional vibration damper (82) is arranged on a radially outer side of said second torsional vibration damper (84); and wherein said second torsional vibration damper arrangement (60) is coupled with said first torsional vibration damper arrangement (58) in an area radially between the first damper element unit (98) and the second damper element unit (110).

2. The hydrodynamic coupling arrangement according to claim 1, wherein the other one of said at least one torsional vibration damper arrangements (58) comprises a single torsional vibration damper (62) having a primary side (68) and a secondary side (74) rotatable around the axis of rotation (A) with respect to said primary side (68) against the action of said damper element arrangement (80); and wherein said other torsional vibration damper arrangement (58) is coupled in an area on the radially outer side of its damper element arrangement (80) to the other one of said torsional vibration damper arrangement (60).

3. The hydrodynamic coupling arrangement according to claim 2, wherein said second torsional vibration damper arrangement (60) is said one torsional vibration damper arrangement, and said first torsional vibration damper arrangement (58) is said other torsional vibration damper arrangement.

4. The hydrodynamic coupling arrangement according to claim 1, additionally comprising at least one coupling element (92) coupled with said first output area (78) and with said second input area (90).

5. Hydrodynamic coupling arrangement according claim 1, wherein said turbine (24) is connected to one of said intermediate mass arrangement and said driven member (56).

6. The hydrodynamic coupling arrangement according claim 1, additionally comprising at least one coupling area (112, 114) in at least one of said first output area (78) and second input area (90), said coupling area (112, 114) extending to said other one of said first output area (78) and said second input area (90).

7. The hydrodynamic coupling arrangement according to claim 6, wherein said at least one of said coupling areas (112, 114) is formed integral with at least one of said first output area (78) and said second input area (90).

8. The hydrodynamic coupling arrangement according to claim 7, additionally comprising at least one coupling element (92) coupled with said coupling area (112) of said first output area (78) and with said coupling area (114) of said second input area (90).

9. The hydrodynamic coupling arrangement according claim 6, wherein one of said at least one coupling areas comprises a coupling element (92) fixed to at least one of said first output area (78) and said second input area (90).

10. The hydrodynamic coupling arrangement according claim 6, additionally comprising a coupling element and wherein said at least one of said coupling area (112, 114) is coupled with one of said coupling element (92) and said other one of said at least one coupling area (112, 114) by engaging toothing for joint rotation around said axis of rotation (A).

11. A hydrodynamic coupling arrangement comprising:
a housing arrangement (12) filled or fillable with fluid;
an impeller (20) rotatable with said housing arrangement (12) around an axis of rotation;
a turbine (24) arranged in said housing arrangement (12);
a lockup clutch (34) having a first friction surface formation (36) coupled with said housing arrangement (12) for rotation around the axis of rotation (A) and a second friction surface formation (42) coupled with a driven member (56) for rotation around said axis of rotation (A) and capable of being brought into frictional engagement with said first friction surface formation (36);
a first torsional vibration damper arrangement (58) disposed in a torque transmission path between said lockup clutch (34) and said driven member (56); said first torsional vibration damper arrangement (58) having a first input area (70) coupled for joint rotation with said second friction surface formation (42) around said axis of rotation and a first output area (78) rotatable with respect to the first input area (70) around the axis of rotation (A) against the action of a first damper element arrangement (80); and a second torsional vibration damper arrangement (60) having a second input area (90) coupled for joint rotation with said first output area (78) around the axis of rotation (A) and a second output area (106) rotatable with respect to said second input area (90) around said axis of rotation (A) against the action of a second damper element arrangement (100) and coupled with said driven member (56) for jointly rotating around said axis of rotation (A); said first torsional vibration damper arrangement (58) and said second torsional vibration damper arrangement (60) arranged successively in direction of said axis of rotation (A); at least one of said torsional vibration damper arrangements (60) comprising at least two torsional vibration dampers (82, 84) arranged so as to be radially staggered and substantially aligned axially with respect to one another; wherein a first of said two torsional vibration dampers (82) comprises a first primary side (88) and a first secondary side (96) rotatable around the axis of rotation (A) with respect to said first primary side (88) against the action of a first damper element unit (98) of said damper element arrangement (100); and a second of said two torsional vibration damper (84) comprises a second primary side (102), said second primary side providing together with said first secondary side (96) an intermediate mass arrangement of the torsional vibration damper arrangement (60), and a second secondary side (104) rotatable around the axis of rotation (A) with respect to said second primary side against the action of a second damper element unit (110) of said damper element arrangement (100); wherein said first torsional vibration damper (82) is arranged on radially outer side of said second torsional vibration damper (84); and wherein said at least one torsional vibration damper arrangement (60) is coupled with said other torsional vibration damper arrangement (58) in one of a radial area of said first damper element unit and on a radially outer side of said first damper element unit.

12. The hydrodynamic coupling arrangement according to claim 11, wherein the other one of said at least one torsional vibration damper arrangement (58) comprises a single torsional vibration damper (62) having a primary side (68) and a secondary side (74) rotatable around the axis of rotation (A) with respect to said primary side (68) against the action of said damper element arrangement (80); and wherein said other one of said at least one torsional vibration damper arrangement (58) is coupled in an area on the radially outer side of said first damper element arrangement (80) to the at least one of said torsional vibration damper arrangement (60).

13. The hydrodynamic coupling arrangement according to claim 11, additionally comprising at least one coupling element (92) coupled with said first output area (78) and with said second input area (90).

14. Hydrodynamic coupling arrangement according claim 11, wherein said turbine (24) is connected to one of said intermediate mass arrangement and said driven member (56).

15. The hydrodynamic coupling arrangement according claim 11, additionally comprising at least one coupling area (112, 114) in at least one of said first output area (78) and said second input area (90), said coupling area (112, 114) extending to said other one of said first output area (78) and said second input area (90).

16. A hydrodynamic coupling arrangement comprising:
a housing arrangement (12) filled or fillable with fluid;
an impeller (20) rotatable with said housing arrangement (12) around an axis of rotation;
a turbine (24) arranged in said housing arrangement (12);
a lockup clutch (34) having a first friction surface formation (36) coupled with said housing arrangement (12) for rotation around the axis of rotation (A) and a second friction surface formation (42) coupled with a driven member (56) for rotation around said axis of rotation (A)

and capable of being brought into frictional engagement with said first friction surface formation (36);

a first torsional vibration damper arrangement (58) disposed in a torque transmission path between said lockup clutch (34) and said driven member (56); said first torsional vibration damper arrangement (58) having a first input area (70) coupled for joint rotation with said second friction surface formation (42) around said axis of rotation and a first output area (78) rotatable with respect to the first input area (70) around the axis of rotation (A) against the action of a first damper element arrangement (80); and a second torsional vibration damper arrangement (60) having a second input area (90) coupled for joint said first output area (78) around the axis of rotation (A) and a second output area (106) rotatable with respect to said second input area (90) around the axis of rotation (A) against the action of a second damper element arrangement (100) and coupled with said driven member (56) for jointly rotating around said axis of rotation (A); said first torsional vibration damper arrangement (58) and said second torsional vibration damper arrangement (60) arranged successively in direction of said axis of rotation (A); at least one of said torsional vibration damper arrangements (60) comprising at least two torsional vibration dampers (82, 84) arranged so as to be radially staggered and substantially aligned axially with respect to one another; wherein a first of said two torsional vibration dampers (82) comprises a first primary side (88) and a first secondary side (96) rotatable around the axis of rotation (A) with respect to said first primary side (88) against the action of a first damper element unit (98) of said second damper element arrangement (100); and a second of said two torsional vibration damper (84) comprises a second primary side (102), said second primary side providing together with said first secondary side (96) an intermediate mass arrangement of the torsional vibration damper arrangement (60), and a second secondary side (104) rotatable around the axis of rotation (A) with respect to said second primary side against the action of a second damper element unit (110) of said damper element arrangement (100); wherein said first torsional vibration damper (82) is arranged on a radially outer side of said second torsional vibration damper (84); and wherein said first output area (78) and said second input area (90) are coupled with one another in an area on a radially inner side of said first damper element arrangement (80) and second damper element arrangement (100).

17. The hydrodynamic coupling arrangement according to claim 16, wherein the other one of said at least one torsional vibration damper arrangements (58) comprises at least two torsional vibration dampers (82', 84') arranged so as to be radially staggered and substantially aligned axially with respect to one another; a first torsional vibration damper (82') comprising a first primary side (88') and a first secondary side (96') rotatable around the axis of rotation (A) with respect to said first primary side (88') against the action of a first damper element unit (98') of said damper element arrangement (100); and a second torsional vibration damper (84') comprising a second primary side (102'), said second primary side together with said first secondary side (96') providing an intermediate mass arrangement of said torsional vibration damper arrangement (60), and a second secondary side (104') rotatable around the axis of rotation (A) with respect to said second primary side (102') against the action of a second damper element unit (110') of said damper element arrangement (100).

18. The hydrodynamic coupling arrangement according to claim 17, wherein said first torsional vibration damper (82') is arranged on the radially outer side of said second torsional vibration damper (84').

19. The hydrodynamic coupling arrangement according to claim 16, wherein the other one of sid at least one of said torsional vibration damper arrangements (60) comprises a single torsional vibration damper (62') having a primary side (68') and a secondary side (74') rotatable around the axis of rotation (A) with respect to said primary side (68') against the action of said first damper element arrangement (80).

20. The hydrodynamic coupling arrangement according claim 16, additionally comprising at least one coupling area (112, 114) in at least one of said first output area (78) and second input area (90), said coupling area (112, 114) extending to said other one of said first output area (78) and said second input area (90).

\* \* \* \* \*